United States Patent
Bierly et al.

(10) Patent No.: US 7,260,141 B2
(45) Date of Patent: Aug. 21, 2007

(54) INTEGRATED BEAMFORMER/MODEM ARCHITECTURE

(75) Inventors: Scott Bierly, Oak Hill, VA (US); Marc Harlacher, Herndon, VA (US); Robert Smarrelli, Oak Hill, VA (US); Aaron Weinberg, Potomac, MD (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 802 days.

(21) Appl. No.: 10/084,614

(22) Filed: Feb. 28, 2002

(65) Prior Publication Data

US 2002/0154687 A1 Oct. 24, 2002

Related U.S. Application Data

(60) Provisional application No. 60/271,961, filed on Feb. 28, 2001.

(51) Int. Cl.
*H04B 1/38* (2006.01)
*H04L 5/16* (2006.01)

(52) U.S. Cl. ............ 375/222; 375/260; 375/340; 375/295; 375/347

(58) Field of Classification Search .......... 375/219, 375/220, 221, 222, 223, 259–260, 340, 299, 375/295, 316
See application file for complete search history.

(56) References Cited

U.S. PATENT DOCUMENTS

| | | | | |
|---|---|---|---|---|
| 3,986,123 | A | * | 10/1976 | Tirro et al. ............ 455/60 |
| 5,583,562 | A | * | 12/1996 | Birch et al. ............ 725/151 |
| 5,631,898 | A | * | 5/1997 | Dent ...................... 370/203 |
| 5,764,187 | A | | 6/1998 | Rudish et al. |
| 5,809,422 | A | * | 9/1998 | Raleigh et al. ......... 455/449 |
| 5,937,348 | A | * | 8/1999 | Cina et al. .............. 455/421 |
| 5,943,010 | A | | 8/1999 | Rudish et al. |
| 6,052,085 | A | | 4/2000 | Hanson et al. |
| 6,072,994 | A | * | 6/2000 | Phillips et al. ......... 455/84 |

(Continued)

FOREIGN PATENT DOCUMENTS

| WO | WO 00/11800 | 3/2000 |
|---|---|---|
| WO | WO 01/59962 | 8/2001 |

OTHER PUBLICATIONS

Bierly, et al.; Sequential-Acquisition, Multi-Band, Multi-Channel, Matched Filter; U.S. Appl. No. 09/707,909, filed Nov. 8, 2000.

*Primary Examiner*—Jean B. Corrielus
(74) *Attorney, Agent, or Firm*—Edell, Shapiro & Finnan, LLC

(57) ABSTRACT

A transceiver employing a steerable phased-array antenna includes a modem architecture in which signals from each antenna element in the array are independently processed down to the individual baseband channel level, and digital beamforming is performed at baseband. The data rate reduction from IF to baseband permits parallel signal data from multiple antenna elements to be time multiplexed and serially processed at acceptable data rates at baseband with minimal modem hardware requirements. Both for transmit signal modulation and received signal demodulation, the computation of carrier tracking, automatic gain control (AGC)/power-control, and beamforming are shared by the same processing circuitry for all channels when performed at baseband. The resulting baseband circuitry is only incrementally larger than that required for carrier tracking and AGC alone, yet accomplishes independent beamforming for each antenna element on each user channel.

33 Claims, 3 Drawing Sheets

U.S. PATENT DOCUMENTS

| | | | |
|---|---|---|---|
| 6,101,399 A * | 8/2000 | Raleigh et al. | 455/561 |
| 6,167,099 A | 12/2000 | Rader et al. | |
| 6,307,506 B1 * | 10/2001 | Despain | 342/368 |
| 6,549,527 B1 * | 4/2003 | Tsutsui et al. | 370/342 |
| 6,615,024 B1 * | 9/2003 | Boros et al. | 455/67.14 |
| 6,763,062 B1 * | 7/2004 | Kohno et al. | 375/220 |
| 6,768,458 B1 * | 7/2004 | Green et al. | 342/375 |
| 6,831,943 B1 * | 12/2004 | Dabak et al. | 375/147 |
| 2002/0141478 A1 * | 10/2002 | Ozluturk et al. | 375/130 |

* cited by examiner

INTEGRATED BEAMFORMER/MODEM ARCHITECTURE

CROSS REFERENCE TO RELATED APPLICATION

This application claims priority from U.S. Provisional Patent Application Ser. No. 60/271,961 entitled "Integrated TDMA Beamformer/Modem Architecture," filed Feb. 28, 2001. The disclosure of this provisional patent application is incorporated herein by reference in its entirety.

BACKGROUND OF THE INVENTION

1. Field of the Invention

The present invention relates to wireless communication transceivers and modems and, more particularly, to the construction of a multi-frequency, multi-channel transceiver system such as might be used in a multi-user base station for terrestrial cellular or fixed-wireless applications.

2. Description of the Related Art

Directional antennas are widely used in a variety of communications systems to more efficiently transmit and receive radiated signals. Relative to an isotropic antenna, which transmits and receives signals equally in all directions, a directional antenna has an antenna gain pattern that is greater in certain directions than others, typically having a higher-gain main lobe several degrees wide (i.e., an antenna beam). Generally, a greater antenna gain reduces the amount of power required to transmit and receive signals between two communication devices. Thus, steering the main lobe of a transceiver's antenna gain pattern in the direction of another communication device facilitates communication between the two devices.

To be useful in certain applications, it may be necessary to rapidly point the antenna beam of a directional antenna in different directions. For example, base stations employed in cellular or wireless communication systems are required to communicate with several mobile communication devices at once. Often, the cell or region covered by the base station is divided into angular sectors (e.g., three 120° sectors), with certain antennas being responsible for communications with any mobile communication devices in a given sector. To permit virtually instantaneous redirecting of the antenna beam within the sector, an antenna formed of a phased array of independently controllable antenna elements may be used. The antenna beam is formed by applying appropriate phase and gain to the individual elements in the array.

More specifically, beamforming is a type of spatial filtering in which an array of sensor elements is controlled with appropriate signal processing to implement a phased array antenna for the purpose of shaping the antenna response over time in a space-varying manner (i.e., steering gain in some directions, while producing attenuation or nulls in other directions). In a radio communications system, a signal arriving at each element of an antenna array will arrive at slightly different times due to the direction of arrival with respect to the antenna array plane (unless the signal has normal incidence to the plane, in which case the signal will arrive at all elements simultaneously). A phased-array receive antenna achieves gain in a particular direction by phase shifting, or time shifting, the signal from each element, and then summing the phase-shifted element signals in a signal combiner. By choosing the relative phasing of each element appropriately, coherence can be achieved for a particular direction of arrival (DOA), across a particular signal bandwidth.

Digital beamforming is analogous to analog beamforming, except that the received signal on each antenna element is independently digitized, and the phasing/combining operation is performed mathematically on the digital samples. The present inventors describe digital beamforming techniques in U.S. patent application Ser. No. 09/778,854 entitled "Integrated Beam Forming/Rake/MUD CDMA Receiver Architecture", filed Feb. 8, 2001, the disclosure of which is incorporated herein by reference in its entirety. Conventionally, digital beamforming is done on a wideband signal, prior to despreading a CDMA waveform. This forces the computationally intense beamforming to take place at a much higher sampling rate, resulting in more mathematical operations per second, and corresponding increased hardware cost. To address this shortcoming, beamforming can be performed at baseband, as disclosed by Hanson et al. in U.S. Pat. No. 6,052,085, the disclosure of which is incorporated herein by reference in its entirety.

Furthermore, digital beamforming is conventionally performed as a separate process, independent of symbol modulation/demodulation, perhaps even as a separate product from the modem. In addition to the resulting inability to support advanced demodulation techniques with this architecture, the cost of the beamforming function is greater as a stand-alone function, compared to the incremental cost of adding the capability to a modem. The largest cost-component of beamforming is the complex multiplication of each sample for each element with the beamforming weights. Thus, whether stand-alone beamformers merely point in the direction of the signal of interest, or respond more adaptively to dynamic interference conditions by null-steering, such beamformers still lack the ability to be tightly coupled with potential advanced demodulation techniques.

When combined with the modem, there is potential to absorb the complex multiply required for beamforming into computation already taking place for extremely low incremental cost. In U.S. Pat. No. 5,764,187, the disclosure of which is incorporated herein by reference, Rudish et al. disclose an implementation of beamforming using digital direct synthesis (DDS) functions. However, Rudish does not suggest or recognize potential hardware and processing savings in both signal transmission and reception. Specifically, Rudish does not suggest combining demodulation with beamforming or using hardware in a time-shared manner for both transmit and receive. Rudish's architecture is highly parallel and does lend itself to time multiplexing techniques which could potentially reduce hardware requirements.

Accordingly, there remains a need for an efficient, integrated way of incorporating beamforming technology, for both transmit and receive, into base stations or transceiver terminals that process large number of users simultaneously using time division multiple access (TDMA) and/or frequency division multiple access (FDMA) technology. This problem can be extremely computationally burdensome, and architectures for cost-effectively performing this processing are not addressed sufficiently in the prior art.

SUMMARY OF THE INVENTION

Therefore, in light of the above, and for other reasons that become apparent when the invention is fully described, an object of the present invention is to integrate digital beamforming capabilities into baseband processing functions such as modulation and demodulation carrier phase rotation and AGC/power-control scaling functions.

Another object of the present invention is to efficiently implement a digital signal processing architecture for a TDMA and/or FDMA base station transceiver performing digital adaptive beamforming with a multi-element antenna array.

A further object of the present invention is to reduce overall hardware and processing requirements in a multi-user transceiver system employing antenna beam steering.

Yet a further object of the present invention is to share common processing elements between modulation and demodulation functions in a modem.

A still further object of the present invention is to take advantage of intermediate frequency (IF) to baseband data rate reductions to process parallel signal data in a time-multiplexed manner at baseband to thereby reduce modem hardware requirements.

Another object of the present invention is to reduce the size and weight of transceiver/modem equipment.

Yet another object of the present invention is to maximize the amount of processing performed with a limited hardware resource.

Still another object of the present invention is to implement transceiver/modem processing of multiple signals in a cost-effective manner.

The aforesaid objects are achieved individually and in combination, and it is not intended that the present invention be construed as requiring two or more of the objects to be combined unless expressly required by the claims attached hereto.

In accordance with the present invention, a modulator/demodulator (modem) architecture is presented for TDMA and FDMA applications. In particular, a transceiver configured to simultaneously communicate with multiple users, such as a base station transceiver, employs a phased-array antenna capable of generating a steerable, directed antenna beam for communication with other devices. Rather than implementing the beamforming phase and amplitude control of the antenna elements in the front-end circuitry, the signals from each antenna element are independently processed all the way down to the individual baseband channel level, and digital beamforming is performed at baseband. While this approach would suggest significantly higher processing demands due to the separate processing for each antenna element, the transceiver of the present invention is implemented using a symmetrical processing structure, leveraging the relationship of increasing computational complexity with decreasing computational rate from IF to baseband processing. Specifically, the data rate reduction from IF to baseband permits parallel signal data from multiple antenna elements to be time multiplexed and serially processed at acceptable data rates at baseband with minimal modem hardware requirements.

Further, the approach of the present invention allows the computation of carrier tracking, automatic gain control (AGC)/power-control, and beamforming to be shared by the same processing circuitry for all channels when performed at baseband. The resulting baseband circuitry is only incrementally larger than that already required in the modem for performing carrier tracking and AGC, yet accomplishes independent beamforming for each antenna element on each user channel. For non-simultaneous transmit/receive systems, such as time division duplex (TDD), additional savings are realized by sharing wideband digital down-converter (DDC) and digital up-converter (DUC) hardware as well as the baseband beamforming circuitry in a time-multiplexed manner between the demodulator and modulator functions.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
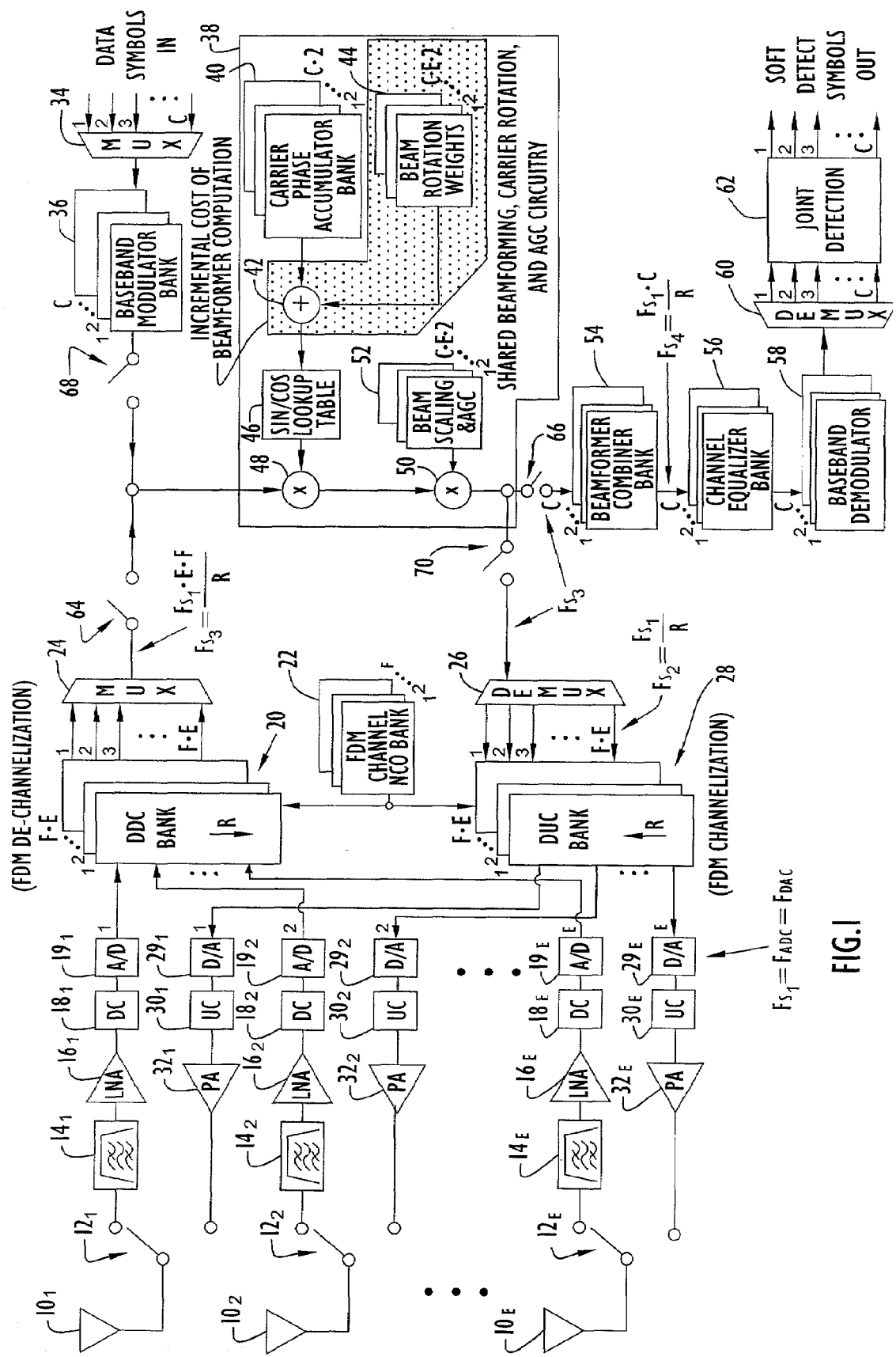
FIG. 1 is a functional block diagram of an integrated TDMA/FMDA beamformer/modem architecture in accordance with an exemplary embodiment of the present invention.
Figure 2:
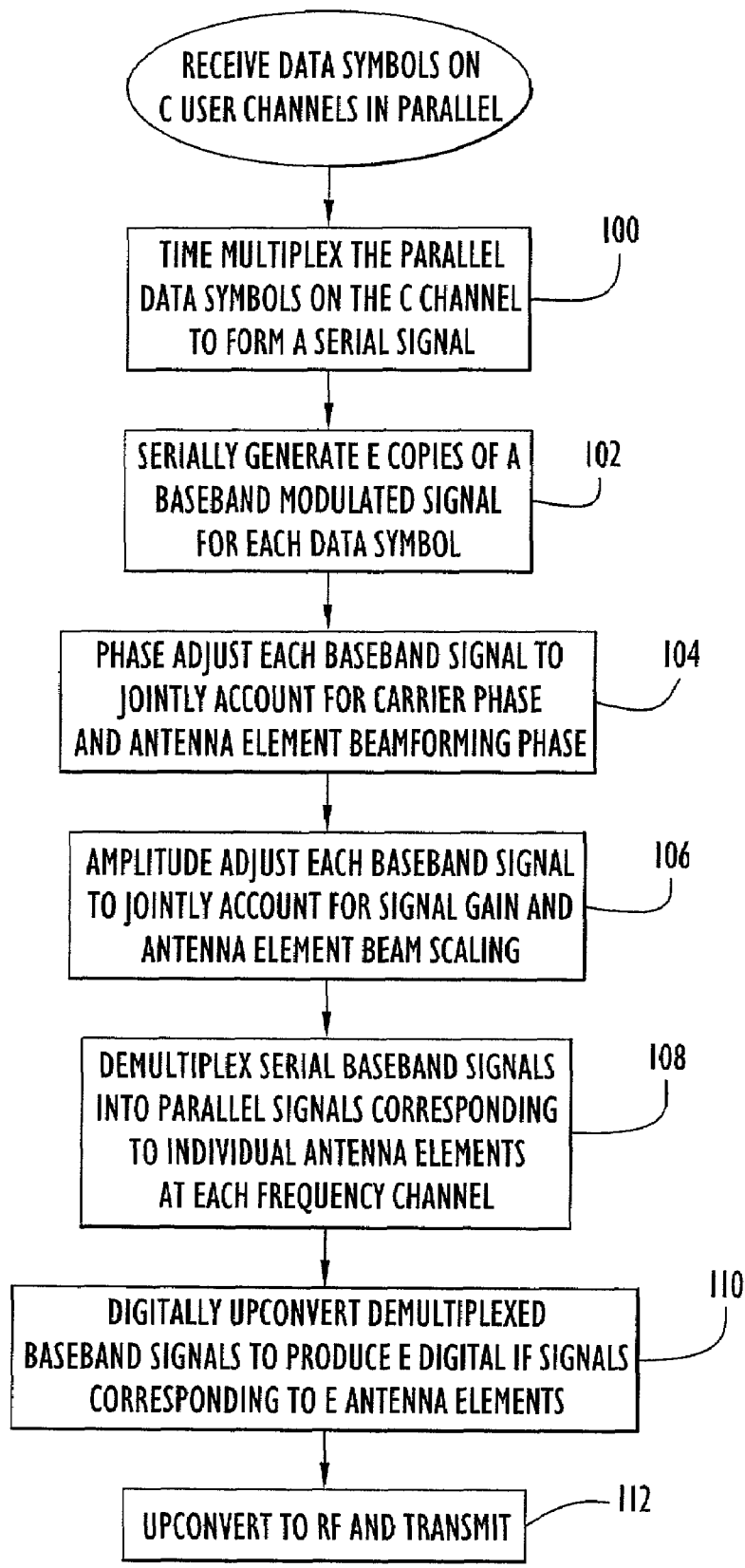
FIG. 2 is a functional flow diagram illustrating the signal processing operations associated with transmitting and modulating signals in accordance with the exemplary embodiment of the present invention.
Figure 3:
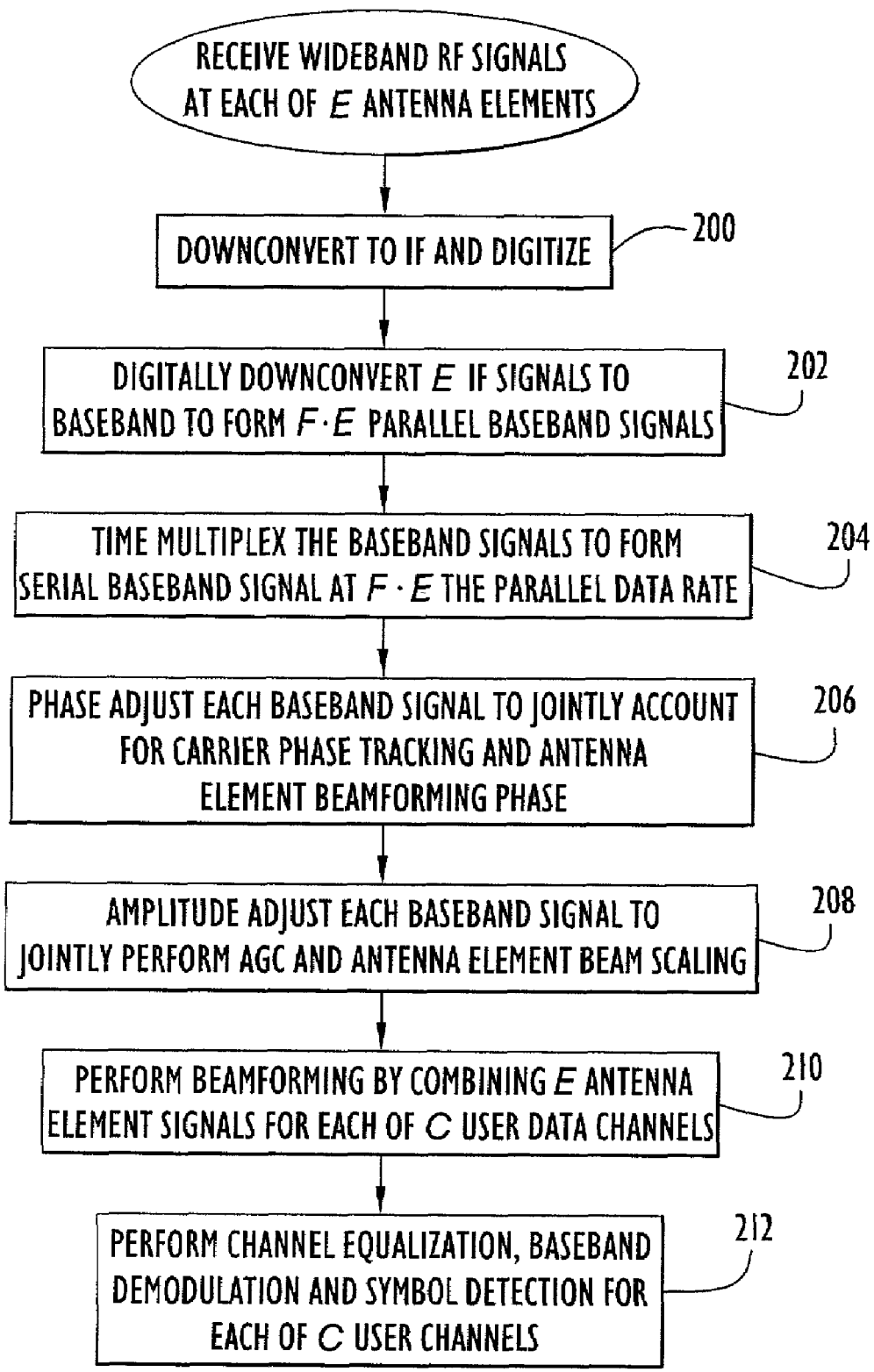
FIG. 3 is a functional flow diagram illustrating the signal processing operations associated with receiving and demodulating signals in accordance with the exemplary embodiment of the present invention.

The following detailed explanations of FIGS. 1-3 and of the preferred embodiments reveal the methods and apparatus of the present invention. FIG. 1 is a generalized functional block diagram of an integrated beamformer/modem architecture in accordance with an exemplary embodiment of the present invention. The beamformer/modem architecture of the present invention can be employed in any communication device that transmits or receives signals from other communication devices. As used herein and in the claims, a "communication device" includes any device, mobile or stationary, that is capable of transmitting and/or receiving communication signals, including but not limited to: a handheld or body-mounted radio; any type of mobile or wireless telephone (e.g., analog cellular, digital cellular, PCS or satellite-based); a pager, beeper or PDA device; a radio or transceiver carried on, built into or embedded in a ground-based or airborne vehicle; any portable electronic device equipped with wireless reception/transmission capabilities, including multimedia terminals capable of receiving/transmitting audio, video and/or data information; and any device mounted in a fixed location with transmission/reception capabilities. The architecture of the present invention is particularly useful in any transceiver communication device requiring the use of directed antenna beams to transmit signals to and receive signals from a plurality of other communication devices used in transmission of audio, video and/or data information including, but not limited to, base stations of wireless communication systems, mobile communication devices, airborne communication systems, and communications satellites.

Referring to FIG. 1, the transceiver beamformer/modem architecture includes a plurality E of transmit/receive antenna elements $10_1$, $10_2$, . . . , $10_E$ forming a phased array antenna which is electronically steerable via digital beamforming. Antenna elements 10 may have any hardware configuration suitable for operating at the frequency and bandwidth required by the communication system in which the transceiver is used. In the specific implementation shown in FIG. 1, the transceiver employs time-division duplexing (TDD) in which the transceiver is alternately in a transmit and receive mode, relying on the phased array antenna for both signal transmission and reception. Accordingly, each antenna element $10_i$ has a corresponding RF switching element $12_i$ selectively connecting the antenna element to the transmitter system and the receiver system. RF switching elements $12_i$ can be a RF transmit/receive switches, circulators, diplexers, hybrid splitters or any other device suitable for selective connecting the antenna elements to the transmit and receive circuitry. It should be understood, however, that the invention is not limited to a TDD architecture, and the present invention can be employed with both simultaneous and non-simultaneous transmit/receive schemes.

On the receiver side, each of the antenna elements $10_1$, $10_2, \ldots, 10_E$ is coupled to a respective bandpass filter $14_1$, $14_2, \ldots, 14_E$ which attenuates signal frequencies outside the filter's pass band. Each antenna element $10_i$ can simultaneously receive signals on a plurality of different frequency channels F within the receiver pass band (frequency division multiplexing FDM). Each frequency channel is in turn time-division multiplexed (TDM), such that the system employs both time division multiple access (TDMA) and frequency division multiple access (FDMA) channelizing. The filtered RF signal from each element $10_1, 10_2, \ldots, 10_E$ is amplified by a corresponding low-noise amplifier (LNA) $16_1, 16_2, \ldots, 16_E$ and then processed by an analog RF down-converter (DC) $18_1, 18_2, \ldots, 18_E$ which down-converts the RF signal to an intermediate frequency (IF). For each of the E IF signals, a corresponding analog-to-digital (A/D) converter $19_1, 19_2, \ldots, 19_E$ digitally samples the IF signal at a wideband input sampling rate $Fs_1$, and the digital IF signal is received by a bank of digital down-converters (DDC) 20 to perform frequency division multiplexing (FDM) de-channelization.

The DDC bank 20 includes a digital down-converter for each of the F frequency channels of each of the E antenna elements for a total of F×E digital down-converters. In practice, it may be possible under certain circumstances to perform digital down-conversion with fewer than F×E actual DDC devices, as will be explained herein in greater detail. DDC bank 20 down-converts the digital IF signal to a baseband frequency by decimating the digital IF signal and FIR filtering to bring the signal in each frequency channel of each antenna element down to baseband. Specifically, each DDC selects every $R^{th}$ sample for inclusion in the baseband signal while discarding the intervening R-1 samples, such that each DDC produces a decimated signal for a particular element and frequency channel at a sampling rate of $$Fs_2 = \frac{Fs_1}{R} \quad (1)$$

The factor R represents the narrowband rate reduction which facilitates multiplexing the multiple elements and frequency channels in order to share baseband processing circuitry. A frequency division multiplexer (FDM) channel numerically controlled oscillator bank 22 comprises F NCOs which are respectively tuned to the center frequency of the F frequency channels. The FDM channel NCO bank 22 supplies the F different frequency signals used by DDC bank 20 to perform the complex multiplying required to bring each of the F frequency channel signals from each of the E antenna elements down to baseband, which are then filtered by FIR filters.

As shown in FIG. 1, each of the digital baseband signals generated in parallel by the F×E DDCs is time multiplexed by multiplexer (MUX) 24 into a serial signal having a rate of $$Fs_3 = \frac{Fs_1 \cdot E \cdot F}{R} \quad (2)$$

The time-multiplexed serial baseband output signal of multiplexer 24 is processed at baseband as described below to detect data symbols for each of C user channels. It should be understood that the various data rates described herein relate to upper limits constrained by the relationships between factors such as the wideband sample rate, the number and bandwidth of frequency and time channels, the decimation/interpolation factor, the number of antenna elements, the number of users channels and input/output symbol rates. Accordingly, a particular architecture can be designed to operate up to particular clock rates in accordance with these relationships. However, these rate relationships do not imply that the hardware must be operated at the maximum designed rate. Thus, for example, while $Fs_3$ is shown in equation (2) to as "equal to" a particular expression, it will be understood that this expression represents an upper limit on the permissible value of $Fs_3$; in operation, $Fs_3$ can be set at an appropriate rate up to the value of this expression.

On the transmitter side, baseband signals are generated at the rate $Fs_3$ and supplied to a demultiplexer (DEMUX) 26. The serial baseband signal stream includes time-multiplexed signals for each antenna element on each user channel. Demultiplexer 26 converts the serial baseband signal to F×E parallel signals, each having a rate of $Fs_2$, which are respectively received by F×E digital up-converters (DUC) of a DUC bank 28 which performs FDM channelization of the baseband signals. Receiving the center frequencies of the F frequency channels from FDM channel NCO bank 22, DUC bank 28 performs the complex multiplying required to up-convert E signals (one for each antenna element) on each of the F channel frequencies into E digital IF signals. Further, to bring the sampling rate up to the wideband sampling rate $Fs_1$, required by the digital-to-analog converters $29_1, 29_2, \ldots, 29_E$ corresponding to antenna elements $10_1, 10_2, \ldots, 10_E$, DUC bank 28 interpolates each of the E digital IF signals by the factor of R. After digital-to-analog conversion, the analog IF signal for each of E antenna elements is up-converted to RF by respective analog up-converters $30_1, 30_2, \ldots, 30_E$ and amplified by respective power amplifiers $32_1, 32_2, \ldots, 32_E$. With RF switching elements $12_1, 12_2, \ldots, 12_E$ positioned to connect the transmit circuitry to respective antenna elements $10_1, 10_2, \ldots, 10_E$, the amplified RF signals are transmitted via the antenna elements in accordance with the beamforming applied in the baseband processing.

Beamforming in a multi-user modem or base station applications in the prior art has principally taken a non-integrated or detached approach. In some cases, beamforming rotation and combining is done in analog in the front-end UC/DC circuitry of the modem. In other cases, beamforming is performed using either analog or digital approaches as a distinct external apparatus from the modem. The approach of the present invention is to incorporate beamforming directly into the modem architecture. To accomplish beamforming, the appropriate relative signal phase and amplitude must be applied to the individual antenna elements to form an antenna beam which has a desired shape and points in a particular direction. To support signal modulation and demodulation, baseband processors typically perform the functions of carrier phase tracking (involving carrier phase rotation) and automatic gain control (AGC) (i.e., adjusting the amplitude of the baseband signal to be within the operational range of downstream devices), although baseband processors do not generally process carrier phase and amplitude on an antenna-element-by-antenna-element basis. In accordance with the present invention, beamforming is integrated into baseband processing such that beamforming computations are performed in a manner requiring only additional adders, due to integration with the existing modulation/demodulation carrier phase rotation and the AGC/power-control scaling functions.

An important novel aspect of the present invention is the independent processing of each antenna element all the way from the antenna elements down to individual baseband channel-level processing. While increasing the baseband computational complexity by a factor of the number of antenna elements E, this approach affords significant performance advantages to each user channel, permitting completely independent antenna beam patterns to be achieved per channel when receiving, as well as individual contributions to the beam pattern when transmitting.

Baseband processing is described in connection with transmission and reception of data symbols associated with a plurality of users. A flow diagram summarizing the signal processing operations associated with modulating and transmitting data symbols is shown in FIG. 2, while a flow diagram summarizing the signal processing operations associated with receiving and demodulating data symbols is shown in FIG. 3. Referring to FIGS. 1 and 2, C independent data streams of symbols are received in parallel on C user channels at a certain data rate. The input data symbols from the C user channels are time multiplexed by multiplexer 34 into a serial signal having a data rate C times the input symbol rate, with each user channel receiving the fraction 1/C of the time slots (operation 100 in FIG. 2). The serial signal is processed by a baseband modulator bank 36 comprising C baseband modulators which respectively generate in a time-multiplexed series baseband signals from the input data symbols of the C user channels for processing by shared baseband processor 38.

Since beamforming is to be performed at baseband, for each input data symbol on each user channel, baseband modulator bank 36 must generate E copies of each symbol (operation 102). Consequently, the data rate of the time-multiplexed signal out of baseband modulator bank 36 is the input data symbol rate times the number of user channels C times the number of antenna elements E, and for each input data symbol time slot, baseband modulator bank 36 produces E identical baseband modulated signals in E corresponding time slots. The output of the baseband modulator bank 36, which is supplied to shared baseband processor 38, is serialized in this manner so that shared baseband processor 38 can be implemented with a single complex multiplier and a single automatic gain control element. Shared baseband processor 38 applies different phases and scaling to each of the E copies of each symbol.

Shared baseband processor 38 includes a carrier phase accumulator bank 40 comprising a single numerically controlled oscillator (NCO) controlled in a time-multiplex manner via a memory bank of phase values corresponding to each user channel C (for both modulation and demodulation). The NCO supplies a rolling phase for the respective data channels to a phase adder 42 in a time-multiplexed manner. A bank of beam rotation weights 44 contains beamforming weights in the form of phase rotations for each channel and each antenna element, which are supplied to phase adder 42 channel-by-channel and element-by-element in a time-multiplexed manner. With C independent user channels, E different antenna elements and both transmit and receive beam steering, beam rotation weight bank 44 includes C×E×2 beamforming phase rotations. Phase adder 42 receives the beamforming rotation weights and adjusts the phase supplied by the carrier phase accumulator bank NCO 40 in accordance with the beamforming phases of the particular antenna elements. A sin/cos lookup table 46 is indexed by the adjusted phase value generated by phase adder 42 and supplies the corresponding sine/cosine multiplicands to a complex multiplier 48 for adjusting the phases of the input time-multiplex baseband signals on a time-slot-by-time-slot basis (operation 104).

The phase-adjusted baseband signal in each time slot is then adjusted in amplitude by a scalar multiplier 50 based on scaling information received from beam scaling and AGC/power control processor 52 (operation 106). Like the bank of beam rotation weights 44, scaling processor 52 applies different scaling on a time-slot basis in accordance with the beam scaling to be applied to a particular antenna element for each user channel and for both signal transmission and reception power control, resulting in C×E×2 different scaling functions. For example, for received signals being demodulated, the automatic gain control adjusts the signal level to be within the operational range of downstream processing, simultaneously taking into account the relative scaling of the different antenna elements for proper beamforming.

By incorporating the individual antenna element phase rotations required to form a beam pattern into baseband signal rotations already required for each channel for carrier tracking, only a modest hardware impact occurs (this impact is shown in FIG. 1 by the dotted box enclosing adder 42 and beam rotation weights 44). This is because the process of carrier tracking already rotates each complex baseband sample by some amount on the unit circle between 0 and $2\pi$ radians. The complexity of this rotation is the same, regardless of the amount of rotation. Thus, by adding the desired beamforming rotation to the sample-by-sample desired carrier tracking rotation, a new sum rotation is formed. This sum rotation is then applied to the existing complex multiplier 48, which simultaneously performs carrier tracking and beam phasing, at the incremental cost of the adder 42 used to compute the rotation sum. In the same manner, the magnitude scaling component of beam weighting is incorporated into the existing AGC or power-control scalar multiplication. If the multiplication of the slowly changing beam scaling weight with the slowly changing AGC or power-control factor can be performed in software (which already calculates those individual values), then this second aspect of the beamforming computation is essentially achieved without additional hardware cost.

The phase and gain adjusted serial baseband signal stream produced by shared baseband processor is received by demultiplexer 26 and processed as previously described. Specifically, demultiplexer 26 converts the serial baseband signal to F×E parallel signals (operation 108) which are digitally up-converted by DUC bank 28 to produce E parallel digital IF signals corresponding to the E antenna elements (operation 110), which are then up-converted to RF at the analog front end and transmitted (operation 112).

Ultimately, the TDMA/FDMA transmission scheme must support transmission of the data symbols on each of the C user channels. The relationship between the input/output data symbol rate of the C user channels and the front end processing rates can be understood as follows. Recall that each of the F frequency-multiplexed channels is time division multiplexed (TDM) to support T users simultaneously. The instantaneous bandwidth of any one of the F frequency-multiplexed channel is equal to the number of TDM users on that channel times the maximum data rate of the users. Thus, for example, if 10 TDM users each having at 1 kbps maximum data rate are sharing one FDM channel, then that FDM channel itself is running at a 10 kbps rate. The overall number of user channels C is then related to the number of frequency channels F by the relationship C=F×T.

In the TDD example shown in FIG. 1, shared baseband processor 38 can also be used in a time-multiplexed manner to process the baseband signal samples generated from received RF signals. Referring to FIG. 3, wideband RF signals received at each of the E antenna elements are down-converted to IF and digitized (operation 200), digitally down-converted to baseband to form F×E parallel baseband signals (operation 202) and then time multiplexed to form a serial baseband signal stream at F×E the parallel data rate (operation 204) in the manner previously described. Shared baseband processor 38 operates on the serial baseband signal stream on a time-slot-by-time-slot basis to adjust the phase and amplitude of the time-multiplexed baseband samples.

In the receive case, the NCO's of the carrier phase accumulator bank 40 respectively track the carrier phase of the signal in each of the C user channels based on feedback from a phase discriminator within the corresponding baseband demodulator 58. The bank of beam rotation weights 44 supplies beamforming weights for each channel and each antenna element in a time-multiplexed manner to adjust the rolling phase from the carrier tracker via adder 42 in accordance with the receive antenna beam. The sin/cos lookup table 46 is indexed by the adjusted phase value generated by phase adder 42 and supplies the corresponding sine/cosine multiplicands to complex multiplier 48 for adjusting the phases of the received time-multiplexed baseband signals on a time-slot-by-time-slot basis (operation 206). The phase adjusted baseband signal in each time slot is then adjusted in amplitude by multiplier 50 based on the required AGC and antenna element beam scaling (operation 208). Thus, beamforming for both modulation and demodulation can be seen to be implemented using the primarily existing baseband carrier rotation/AGC/power-control computational hardware. The beamformer/demodulator function can be used to compute the direction of arrival (DOA) of each user signal as it is processed. This not only accomplishes tracking of the received beam pattern on the signal, but also provides a known bearing for use during transmit beamforming.

The phase and amplitude adjusted baseband samples are supplied to a beamformer combiner bank 54 which, for each user channel C, combines at baseband the E simultaneously-received antenna element signals. That is, the antenna element signals forming a particular receive antenna beam via their appropriate phase and amplitude adjustments are combined to realize the resultant signal received via the particular antenna beam. The serial output data stream from beamformer combiner bank 54 has a data rate of $$F_{S_4} = \frac{F_{S_1} \cdot C}{R} \quad (3)$$

The output of beamformer/combiner bank 54 is supplied to a channel equalizer bank 56 comprising C channel equalizers which perform channel equalization on the C respective user channel signals. The output of channel equalizer bank 56 is supplied to a baseband demodulator 58 which demodulates the baseband signals for each of the C user channels. A demultiplexer 60 serial-to-parallel converts the output of baseband demodulator 58, and the C parallel signals undergo joint detection 62 to produce C soft detect output symbols.

As illustrated in FIG. 1, non-simultaneous transmit/receive cases, such as TDD, allow FDM Channel-NCO-Bank and Beamforming/Carrier-Rotation/AGC/Power-Control functions to be time-shared between modulation and demodulation computation. Identical mathematical functionality is required during both modulation and demodulation, but operating on different signal data and different state information such as FDM frequency channel, carrier frequency offset, NCO phase, beam weights, and AGC/Power-Control values. Thus, the computational hardware is reused in both modes, while appropriate signal data must be routed to the hardware, and appropriate state vectors retrieved from local storage (e.g., random access memory (RAM)) and routed to the hardware. In FIG. 1, signal data is routed at the correct time by synchronizing the switching of the RF switching elements $12_{1-E}$ as well as closing either switches 64 and 66 to connect the shared baseband processor 38 to the receiver/demodulator circuitry or switches 68 and 70 to connect the shared baseband processor to the modulation/transmitter circuitry; internal state vectors are represented by the boxes that have depth (e.g., carrier phase accumulator bank, which is implemented as a single hardware accumulator connected to a RAM containing C*2 accumulated phase words).

It is also possible in a TDD-type system to share much of the computational complexity of the DDC bank and DUC bank (for purposes of clarity, this potential sharing is not shown in FIG. 1). In both cases, for instance, F*E wideband complex multiplies must be performed for TDM tuning. Furthermore, F*E FIR filters must be implemented at the wideband $Fs_1$, rate, using identical filter coefficients in both cases (for the DDC case, the filter is decimating by a factor of R, and for the DUC case the filter is interpolating by a factor of R), essentially the same hardware is required to perform the filtering operation, allowing a single efficient structure to perform both functions.

If non-beamforming prior-art modem architectures were merely extended to support multiple elements, wideband computational complexity would be increased by a factor of E. Another important aspect of the present invention is the manner in which this additional signal processing complexity due to beamforming is implemented. By exploiting several architectural innovations that perform this extended processing in a non-obvious manner, the additional capabilities are obtained at reduced implementation cost. Firstly, in the wideband DDC/DUC processing, the prior art (or extrapolation thereof) technique would simply repeat DDC/DUC modules on a per-element basis. According to the present invention, the DDC and DUC modules are broken down into constituent functions of NCO, complex multiplication, and interpolation/decimation FIR filtering. While the state vectors of those functions are unique and must be maintained for each element and frequency, both up-converting and down-converting, the computation is almost identical. Therefore, the present invention shares that processing between elements, frequencies, up-conversion, and down-conversion as is appropriate given the processing required by the input sampling rate $Fs_1$, and the arithmetic processing rate Fp. For example, if $Fp/Fs_1$, is four, then a single physical DDC/DUC hardware resource can actually be shared across four elements or frequencies. Furthermore, in a time-multiplexed transmit/receive scenario, a single computational hardware implementation can serve as both DDC and DUC. As previously mentioned, in a TDD system, the DDC and DUC NCOs produce the same frequency waveform for a given frequency channel, and can thus be directly shared.

As has already been noted, significant complexity exists in the baseband portion of the beamforming base station modem. This is true for both arithmetic computation, as well as variety and multiple-rates of data operands for frequency bands, channel time slots, and antenna elements. Additional novel features of the present invention specifically address the organization of this complexity, to produce a dataflow architecture that can be effectively implemented on a VLSI, FPGA or ASIC type device. The typically large interpolation/decimation factor R is leveraged and used to multiplex/demultiplex the F×E streams of complex data from/to the DDC/DUC processing functions. This approach reduces the wiring interconnect complexity compared to other approaches. If R is greater than the product F×E, the sequential frequency/element data stream can likely be demodulated and beamformed by a single processing unit, as shown in FIG. 1; otherwise, multiple units would service the excess computational demand. This also applies to the beamformer/combiner function. In a TDD system, where modulation and demodulation do not occur at the same time, this carrier-tracking/beamforming hardware is also shared for both modulation and demodulation. In an FDD system, twice the capacity would be required, either through R being at least 2×F×E, or through an additional computational block.

As illustrated in FIG. 1, the additional functions of baseband modulation, channel equalizer, baseband demodulation, and detection are achieved through distinct hardware blocks. In the manner just described, a single instance of these processing blocks can handle all C user channels, in this case where R is greater than or equal to C. Since this modem jointly demodulates many (C) users simultaneously, advanced signal processing techniques such as joint detection are readily enabled by the present invention.

Although beamforming on each user channel C requires a relatively large amount of beamforming computation to be performed (E*C complex multiply-accumulates per sample), this computation is at baseband, thus leveraging the sampling rate reduction of 1/R due to filtering and decimation in the DDC. Consequently, the beamforming computation rate in the share baseband processor is given by $$Fs_5 = \frac{2 \cdot Fs_1 \cdot E \cdot C}{R} \qquad (4)$$

If 2×E×C can be set to be approximately equal to R, then it can be seen that the entire beamforming computation for all user channels, transmit and receive, can be accomplished with a single complex multiply-accumulator running at the input sample rate $Fs_1$. This example is for the case of transmit/receive multiplexing.

The present invention improves the state of the art by mitigating the growth in wideband hardware complexity due to beamforming through novel restructuring of fundamental transceiver building blocks. At the same time, baseband hardware complexity growth is also minimized. The complex weighting required for beamforming potentially represents the largest impact of all. However, by incorporating the element rotations required to form a beam pattern into baseband signal rotations already required for each channel for carrier tracking, only a modest hardware impact occurs.

One of the principal advantages of the present invention is the potential for dramatically increasing processing capability in applications where there is a limited hardware resource. For example, where the digital signal processing associated with up/down-converting and modulation/demodulation are to be implemented on field programmable gate arrays (FPGA), there is a fixed resource and a finite number of processing/memory elements that can be formed on the chip. Consider an example where the signals being processed are voice circuits in a cellular base station, where typical processing rates are 10 to 20 kHz. If modem processing is performed at clock rates on this order, a tremendous waste of expensive hardware resources results, since, regardless of the processing rates, the modem processing requires complex multipliers, random access memories, arithmetic logic, oscillators, and other signal processing hardware to be formed in the FPGA. According to the present invention, by employing time-multiplexing in the modem processing between user channels, antenna elements and modulation/demodulation, and by operating the FPGA at 10 MHz to accommodate the time-multiplex a thousand times more voice signal processing can be performed on a comparable FPGA with roughly the same amount of circuitry therein. Thus, in additional to cost savings, the invention is advantageous in any application where smaller size and weight would be beneficial, such as in handheld or airborne units.

The present invention advantageously permits an element snapshot memory to operate at narrowband sampling rates, allowing an eased implementation for any snapshot operations required. Furthermore, these snapshots occur after narrowband channel filtering, thus containing only received signals of interest for that frequency band.

Further, integration of the beamformer with the demodulator in the present invention allows advanced adaptive algorithms to be implemented that can be enhanced by the feedback of post-demodulation metrics such as carrier-SNR/phase, symbol-SNR/phase, and error control decoding metrics.

In accordance with another aspect of the present invention, the beamformer spatial processing for each user channel is integrated with demodulation functionality, such as adaptive equalization temporal processing, allowing more complex algorithms to be implemented that jointly perform spatial/temporal optimization.

While the present invention has been described in the context of multiple user channels and certain features of the present invention are most advantageously exploited in this context, it will be understood that the present invention is nevertheless useful in the context of a single user channel or only a few user channels, and can be employed in devices such as mobile communication devices serving only a single end-user at a time. Further, the baseband time-multiplexing and shared processing techniques described herein can be employed in systems using only one of TDMA and FDMA, and has applicability in virtually any multi-user communication system employing multiplexing, including those employing code division multiple access (CDMA).

The present invention performs demodulation and detection of potentially all visible user channels in the antenna field of view. This capability facilitates the joint detection (rather than individual) of all channels simultaneously, which is known in the prior art to substantially increase cellular capacity. The present invention further enables the combined processing of beamforming, equalization, and joint detection in a single demodulation process.

Having described preferred embodiments of new and improved integrated beamformer/modem architecture, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus for modulating and demodulating signals transmitted and received via an electronically steerable phased array antenna comprising a plurality of antenna elements, the apparatus comprising:
   a baseband modulator configured to modulate outbound digital baseband signals to be transmitted via the phased array antenna;
   a baseband demodulator configured to demodulate incoming digital baseband signals generated from signals received via the phased array antenna; and
   a shared baseband processor configured to receive digital baseband signals including the modulated outbound digital baseband signals and the incoming digital baseband signals, said shared baseband processor applying a single phase adjustment to each of the digital baseband signals to jointly account for both beamforming phase rotation and carrier phase rotation of individual antenna elements.

2. The apparatus of claim 1, wherein said digital baseband signals received by said shared baseband processor are time multiplexed, and said shared baseband processor operates on said digital baseband signals on a time-slot-by-time-slot basis.

3. The apparatus of claim 1, wherein said baseband modulator receives data symbols from a plurality of user channels and supplies to said shared baseband processor a time-multiplexed stream of modulated digital data symbols from said plurality of user channels.

4. The apparatus of claim 3, wherein, for each input digital data symbol, said baseband modulator generates a plurality of modulated digital data symbols in the time-multiplexed stream respectively corresponding to the plurality of antenna elements.

5. The apparatus of claim 1, wherein said shared baseband processor comprises:
   a numerically controlled oscillator configured to generate a stream of carrier phases for digital baseband signals of each of a plurality of user channels in a time-multiplexed manner;
   a beamforming phase rotator configured to generate a stream of beam rotation phases corresponding to individual antenna elements for each of the plurality of user channels in a time-multiplexed manner;
   a phase adder configured to sum the beam rotation phases and the carrier phases to produce a time-multiplexed stream of combined phase adjustments; and
   a complex multiplier configured to adjust phases of a time-multiplexed stream of digital baseband signals corresponding to the plurality of user channels in accordance with the combined phase adjustments.

6. The apparatus of claim 5, wherein said combined phase adjustments index a sine/cosine lookup table which supplies multiplicands to said complex multiplier.

7. The apparatus of claim 1, wherein said shared baseband processor comprises a multiplier which performs complex multiplication on digital baseband signals relating to a plurality of user channels in a time-multiplexed manner.

8. The apparatus of claim 1, wherein said shared baseband processor comprises a multiplier which performs complex multiplication on digital baseband signals associated with a plurality of individual antenna elements in a time-multiplexed manner.

9. The apparatus of claim 1, wherein said shared baseband processor comprises a beam scaling and power control processor configured to generate a time-multiplexed stream of gain control signals for digital baseband signals corresponding to individual antenna elements for each of a plurality of user channels, the gain control signals jointly accounting for power control and antenna element beam scaling; and
   a multiplier configured to adjust amplitudes of a time-multiplexed stream of digital baseband signals corresponding to the plurality of user channels in accordance with the gain control signals.

10. The apparatus of claim 1, further comprising:
    a baseband beamformer configured to receive time-multiplexed digital baseband signals from said shared baseband processor corresponding to individual antenna elements, said baseband beamformer forming a combined signal from said time-multiplex digital baseband signals.

11. The apparatus of claim 1, further comprising:
    a plurality of digital down-converters respectively down-converting digitized signals received from the plurality of antenna elements to produce parallel streams of sampled digital baseband signals; and
    a multiplexer receiving the parallel streams of sampled digital baseband signals and supplying a time-multiplexed stream of the sampled digital baseband signals to said shared baseband processor.

12. The apparatus of claim 11, wherein said plurality of digital down-converters perform decimation to reduce a sampling rate of the sampled digital baseband signals.

13. The apparatus of claim 11, wherein said plurality of digital down-converters separately down-convert digitized signals for each antenna element for each of a plurality of frequency channels.

14. The apparatus of claim 1, further comprising:
    a demultiplexer receiving a time-multiplexed stream of digital baseband signals from said shared baseband processor and generating parallel streams of digital baseband signals corresponding to the plurality of antenna elements; and
    a plurality of digital up-converters respectively up-converting the parallel streams of digital baseband signals to produce a plurality of digitized intermediate frequency signals corresponding to the plurality of antenna elements.

15. The apparatus of claim 14, wherein said plurality of digital up-converters perform interpolation to increase a sampling rate of the digitized intermediate frequency signals.

16. The apparatus of claim 14, wherein said plurality of digital up-converters separately up-convert digital baseband signals for each antenna element for each of a plurality of frequency channels.

17. The apparatus of claim 1, wherein signals are transmitted and received using time division duplex, said apparatus further comprising switching elements to selectively connect said shared baseband processor to said baseband modulator and front-end transmit circuitry for signal transmission and to said baseband demodulator and front-end receive circuitry for signal reception.

18. The apparatus of claim 1, wherein said apparatus employs time division multiple access (TDMA) to transmit and receive signals.

19. The apparatus of claim 1, wherein said apparatus employs frequency division multiple access (FDMA) to transmit and receive signals.

20. The apparatus of claim 1, wherein said apparatus is a field programmable gate array (FPGA).

21. The apparatus of claim 1, wherein the apparatus is implemented via a very large scale integration (VLSI) circuit or an application specific integrated circuit (ASIC).

22. The apparatus of claim 1, wherein said apparatus is a modem.

23. The apparatus of claim 1, wherein said apparatus is a transceiver.

24. The apparatus of claim 1, wherein said apparatus is a basestation transceiver.

25. The apparatus of claim 1, wherein the shared baseband processor adjusts amplitudes of the digital baseband signals to perform power control and antenna element beam scaling.

26. A method of processing an RF signal received via an electronically steerable phased array antenna comprising a plurality of antenna elements, the method comprising:
(a) separately down-converting the RF signal from each antenna element to an intermediate frequency (IF) signal;
(b) separately analog-to-digital converting the IF signal from each antenna element;
(c) separately digitally down-converting the digital IF signal from each antenna element to a digital baseband signal to form a set of parallel baseband signals from the plurality of antenna elements;
(d) time multiplexing the set of parallel baseband signals to form a serial stream of digital baseband signals;
(e) applying a single phase adjustment to each of the digital baseband signals in the serial stream to jointly account for both carrier phase tracking and antenna element beamforming; and
(f) performing beamforming by combining digital baseband signals respectively associated with the plurality of antenna elements.

27. The method of claim 26, wherein (c) includes decimating the digital IF signal from each antenna element to reduce a number of samples in the serial stream of digital baseband signal.

28. The method of claim 26, wherein (c) includes generating baseband signals for a plurality of frequency channels from the digital IF signal of each antenna element, such that digital samples in the serial stream of digital baseband signals are associated with a particular antenna element and frequency channel.

29. A method of processing signals to be transmitted via an electronically steerable phased array antenna comprising a plurality of antenna elements, the method comprising:
(a) generating a stream of digital baseband signals representing data symbols to be transmitted via the phased array antenna, wherein digital baseband signals in the stream are associated with individual antenna elements;
(b) applying a single phase adjustment to each of the digital baseband signals to jointly account for both carrier phase rotation and antenna element beamforming;
(c) demultiplexing the stream of digital baseband signals into a plurality of parallel signals respectively associated with individual antenna elements;
(d) digitally up-converting the parallel signals to produce a plurality of digital intermediate frequency (IF) signals respectively associated with individual antenna elements;
(e) digital-to-analog converting the digital IF signals to produce a plurality of analog IF signals respectively associated with individual antenna elements; and
(f) up-converting the analog IF signals to RF signals for transmission via the phased array antenna.

30. The method of claim 29, wherein the phased array antenna simultaneously transmits signals on a plurality of frequency channels, and the stream of digital baseband signals includes signals associated with individual ones of the frequency channels.

31. An apparatus for modulating and demodulating signals transmitted and received via an electronically steerable phased array antenna comprising a plurality of antenna elements, the apparatus comprising:
a baseband modulator configured to modulate outbound digital baseband signals to be transmitted via the phased array antenna;
a baseband demodulator configured to demodulate incoming digital baseband signals generated from signals received via the phased array antenna; and
a shared baseband processor configured to receive digital baseband signals including the modulated outbound digital baseband signals and the incoming digital baseband signals, said shared baseband processor applying phases to the digital baseband signals to account for both beamforming phase rotation and carrier phase rotation of individual antenna elements, wherein the shared baseband processor generates a stream of combined phase adjustments by summing a stream of carrier phases for the digital baseband signals with a stream of beam rotation phases for the digital baseband signals, and adjusts phases of the digital baseband signals in accordance with the combined phase adjustments.

32. A method of processing an RF signal received via an electronically steerable phased array antenna comprising a plurality of antenna elements, the method comprising:
(a) separately down-convening the RF signal from each antenna element to an intermediate frequency (IF) signal;
(b) separately analog-to-digital convening the IF signal from each antenna element;
(c) separately digitally down-convening the digital IF signal from each antenna element to a digital baseband signal to form a set of parallel baseband signals from the plurality of antenna elements;
(d) time multiplexing the set of parallel baseband signals to form a serial stream of digital baseband signals;

(e) generating a stream of carrier phases for the digital baseband signals;
(f) generating a stream of beam rotation phases for the digital baseband signals;
(g) summing the beam rotation phases and the carrier phases to produce a stream of combined phase adjustments;
(h) applying the stream of combined phase adjustments to the digital signals in the serial stream to account for both carrier phase tracking and antenna element beamforming; and
(i) performing beamforming by combining digital baseband signals respectively associated with the plurality of antenna elements.

33. A method of processing signals to be transmitted via an electronically steerable phased array antenna comprising a plurality of antenna elements, the method comprising:
(a) generating a stream of digital baseband signals representing data symbols to be transmitted via the phased array antenna, wherein digital baseband signals in the stream are associated with individual antenna elements;
(b) generating a stream of carrier phases for the digital baseband signals;
(c) generating a stream of beam rotation phases for the digital baseband signals;
(d) summing the beam rotation phases and the carrier phases to produce a stream of combined phase adjustments;
(e) applying the stream of combined phase adjustments to the stream of digital baseband signals to account for both carrier phase rotation and antenna element beamforming;
(f) demultiplexing the stream of digital baseband signals into a plurality of parallel signals respectively associated with individual antenna elements;
(g) digitally up-converting the parallel signals to produce a plurality of digital intermediate frequency (IF) signals respectively associated with individual antenna elements;
(h) digital-to-analog converting the digital IF signals to produce a plurality of analog IF signals respectively associated with individual antenna elements; and
(i) up-converting the analog IF signals to RF signals for transmission via the phased array antenna.

* * * * *

UNITED STATES PATENT AND TRADEMARK OFFICE
CERTIFICATE OF CORRECTION

| | | |
|---|---|---|
| PATENT NO. | : 7,260,141 B2 | Page 1 of 1 |
| APPLICATION NO. | : 10/084614 | |
| DATED | : August 21, 2007 | |
| INVENTOR(S) | : Scott Bierly et al. | |

It is certified that error appears in the above-identified patent and that said Letters Patent is hereby corrected as shown below:

Front Page, Foreign Patent Documents:

Add  --WO 96/22662  12/1995--

Col. 16, ll. 57, 60, 62:  "convening" should read --converting--

Signed and Sealed this

Twenty-ninth Day of April, 2008

JON W. DUDAS
*Director of the United States Patent and Trademark Office*